US006654651B2

United States Patent
Ashida et al.

(10) Patent No.: US 6,654,651 B2
(45) Date of Patent: Nov. 25, 2003

(54) INFORMATION PROVIDING METHOD, PRINT SYSTEM AND EVENT SYSTEM

(75) Inventors: Shingo Ashida, Kato (JP); Yasuo Ohmori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 72 days.

(21) Appl. No.: 09/893,901

(22) Filed: Jun. 29, 2001

(65) Prior Publication Data

US 2002/0103561 A1 Aug. 1, 2002

(30) Foreign Application Priority Data

Feb. 1, 2001 (JP) ........................................ 2001-025034

(51) Int. Cl.$^7$ ................................................ G06K 7/06
(52) U.S. Cl. ......................... 700/83; 700/90; 340/5.1; 340/5.91; 235/380
(58) Field of Search ........................ 700/90, 83; 705/26, 705/50, 51, 55, 56, 62; 340/10.1, 10.2, 10.3, 10.5, 10.51, 10.52, 10.56, 5.1, 5.91; 235/380

(56) References Cited

U.S. PATENT DOCUMENTS

| 4,449,186 A | * | 5/1984 | Kelly et al. ................. 364/407 |
| 4,654,793 A | * | 3/1987 | Elrod ........................... 364/401 |
| 5,287,269 A | * | 2/1994 | Dorrough et al. ........... 364/408 |
| 5,321,395 A | * | 6/1994 | Van Santbrink ........ 340/825.31 |
| 5,796,351 A | * | 8/1998 | Yabuki ................... 340/625.69 |
| 5,936,542 A | * | 8/1999 | Kleinrock et al. ...... 340/825.34 |
| 5,943,042 A | * | 8/1999 | Siio ............................ 345/172 |
| 6,194,992 B1 | * | 2/2001 | Short et al. .................. 340/5.9 |
| 2001/0041994 A1 | * | 11/2001 | Kim ................................ 705/5 |
| 2002/0068991 A1 | * | 6/2002 | Fitzsimmons, Jr. .......... 700/214 |

FOREIGN PATENT DOCUMENTS

| JP | 7-192058 | | 7/1995 | | |
| JP | 9-116657 | | 5/1997 | | |
| JP | 11-134129 | | 5/1999 | | |
| JP | 2000207468 A | * | 7/2000 | ........... | G06F/17/60 |
| JP | 2002279158 A | * | 9/2002 | ........... | G06F/17/60 |
| KR | 2001112172 A | * | 12/2001 | ........... | G06K/17/00 |

* cited by examiner

Primary Examiner—Albert W. Paladini
Assistant Examiner—Sean Shechtman
(74) Attorney, Agent, or Firm—Staas & Halsey LLP (57) ABSTRACT

A method for providing information or a printed matter of the information smoothly in a meeting place such as a museum or an exhibition is provided. A card reader reads an ID card that a tourer carries, so as to obtain information relating to an exhibit corresponding to the card reader. Then, the obtained information is printed and is passed to the tourer.

4 Claims, 6 Drawing Sheets

| CARD READER NAME | STORE LOCATION INFORMATION (URL) | ... |
|---|---|---|
| CRA1 | http://www.abcde.co.jp/exh1.html | |
| CRA2 | http://www.abcde.co.jp/exh2.html | |
| ⋮ | ⋮ | |
| CRAn | http://www3.xyzxyz.co.jp/manual.html | |
| ⋮ | ⋮ | |

INFORMATION PROVIDING METHOD, PRINT SYSTEM AND EVENT SYSTEM

BACKGROUND OF THE INVENTION

1. Field of the Invention

The present invention relates to a method for providing information and a printing system used at a museum, an exhibition or other meeting places.

2. Description of the Prior Art

Conventionally, at a meeting place such as a museum or an exhibition, tourers are usually handed some materials about the display. The tourer who is handed unnecessary materials may feel somewhat troublesome with increased baggage. For the exhibitor, on the other hand, it may take a wasteful cost for distributing materials to every tourer without considering his or her need. In addition, the waste of resources such as paper is not good for environmental protection.

There is another method for distributing materials, in which materials are not handed but are placed near an exhibit, so that tourers can take the materials without restraint. Though this method can reduce the waste compared with the handing method, the materials should be prepared sufficiently so as not to be run out.

To solve this problem, it may be considered to print the materials just on demand of the tour. In this method, a technique called a "network printing" in which a printer is shared via a network can be used. Every booth is provided with a terminal, which is connected to the communication network, to which a printer is connected. Then, each terminal transmits print data to the printer for printing.

Recently, several standards are proposed for the network printing. For example, the IPP (INTERNET Printing Protocol) is a communications protocol that is proposed as an upper layer protocol of the TCP/IP. The IPP enables to transmit print data to a printer belonging to another LAN via the INTERNET, so as to perform printing.

However, in the conventional network printing including the one using the IPP, it is required to transmit print data from a terminal to a printer.

Therefore, even if a computer except the terminal at the exhibition booth stores print data, it is required to download print data into a terminal in the exhibition booth, and then transmit the data to a printer. In other words, it is not permitted to transmit print data from a computer storing the print data to a printer directly. However, it is desirable for exhibitor to transmit print data to a printer directly for reducing a load of a terminal, for managing print data, or for reducing communication traffic.

In addition, it is desirable for tourers that the operation of a terminal for demanding materials is easy.

Furthermore, there is a case where one printer located remotely from the exhibition booth is used for printing materials or another case where materials demanded by many tourers are printed by using one printer. In these cases, it is desired to provide each tourer with the materials efficiently.

SUMMARY OF THE INVENTION

An object of the present invention is to provide a method for providing tourers with information smoothly at a museum, an exhibition or other meeting places, and a print system for providing tourers with printed materials there.

A method for providing information according to one embodiment of the present invention comprises the steps of installing an ID reading device corresponding to an exhibit for reading a user ID from an ID recording medium, letting the ID reading device read the ID recording medium that a user carries, so as to obtain information about the exhibit corresponding to the ID reading device, and passing the obtained information to the user who carries the ID recording medium that was used for obtaining the information.

Preferably, contents of the obtained information are printed by a printer, and the information as a printed matter is passed to the user.

Alternatively, the obtained information is transmitted to an address designated by the user in the form of an electronic mail.

Alternatively, when using paper as a medium for providing information, the method for providing a printed matter comprises the steps of installing an ID reading device corresponding to an exhibit for reading a user ID from an ID recording medium, letting the ID reading device read the ID recording medium that a user carries, so as to obtain information about the exhibit corresponding to the ID reading device, printing the information by a printer when the ID recording medium is read by an ID reading device that is provided for instructing a print process, and passing a printed matter to the user who carries the ID recording medium corresponding to the printed matter.

In another embodiment, the method for providing a printed matter comprise the steps of installing an ID reading device corresponding to an exhibit for reading a user ID from an ID recording medium, letting the ID reading device read the ID recording medium that a user carries, so as to obtain information about the exhibit corresponding to the ID reading device via the INTERNET in accordance with a set URL, printing the information by a printer while sorting the information for each ID of the ID recording medium carried by the user, passing the printed matter to the user who carries the ID recording medium corresponding to the printed matter.

An information providing system according to one embodiment of the present invention comprises an ID reading device installed corresponding to an exhibit for reading a user ID from an ID recording medium, obtaining means for obtaining information relating to the exhibit corresponding to the ID reading device in accordance with an output of the ID reading device, and recording means for recording the obtained information onto an information recording medium.

A print system according to one embodiment of the present invention comprises an ID reading device installed corresponding to an exhibit for reading a user ID from an ID recording medium, obtaining means for obtaining information relating to the exhibit corresponding to the ID reading device in accordance with an output of the ID reading device, print instructing means for issuing a print instruction of the obtained information, and a printer for printing the information about which the print instruction is issued so as to output a printed matter.

Preferably, an ID reading device is provided for issuing the print instruction, and the print instructing means issue the print instruction when the user lets the ID reading device read the ID recording medium.

Alternatively, the print instructing means issue the print instruction of the information obtained by the obtaining means in accordance with an output of the ID reading device, and the printer prints the information about which the print instruction is issued while sorting the information for each ID.

Moreover, the obtaining means obtain the information via the INTERNET in accordance with a URL that is set in relation to the exhibit.

In another embodiment, the method for providing information comprises the steps of installing the information providing system at a meeting place, distributing an ID recording medium storing a user ID for identifying a user to each of the users entering the meeting place, reading the ID recording medium by the ID reading device that is installed corresponding to an exhibit in the meeting place, so as to obtain information about the exhibit corresponding to the ID reading device, recording the obtained information onto the information recording medium, and passing the information recording medium to the user having the ID recording medium corresponding to the information recording medium at an exit of the meeting place.

In still another embodiment, the method for providing information comprises the steps of installing a print system in a meeting place, distributing an ID recording medium storing a user ID for identifying a user to each of the users entering the meeting place, reading the ID recording medium by the ID reading device that is installed corresponding to an exhibit in the meeting place, so as to obtain information about the exhibit corresponding to the ID reading device, printing the obtained information by a printer, and passing the printed matter to the user having the ID recording medium corresponding to the printed matter at an exit of the meeting place.

An event system according to one embodiment of the present invention is a system for providing information to a user entering an event meeting place. The system comprises an ID reading device installed corresponding to an exhibit for reading a user ID from an ID recording medium, user information obtaining means for obtaining private information of the user, user information recording means for recording the private information, obtaining means for obtaining information relating to the exhibit corresponding to the ID reading device in accordance with an output of the ID reading device, and recording means for recording the obtained information onto an information recording medium.

Preferably, the event system for providing information to a user entering an event meeting place comprises user information obtaining means for obtaining private information of the user, user information recording means for recording the private information of the user and a user ID issued for the user onto the ID recording medium, an ID reading device installed corresponding to an exhibit for reading the user ID from the ID recording medium, obtaining means for obtaining information relating to the exhibit corresponding to the ID reading device in accordance with an output of the ID reading device, and recording means for recording the obtained information onto an information recording medium.

DESCRIPTION OF THE PREFERRED EMBODIMENTS

Hereinafter, the present invention will be explained more in detail with reference to embodiments and drawings.

First Embodiment

Figure 1:
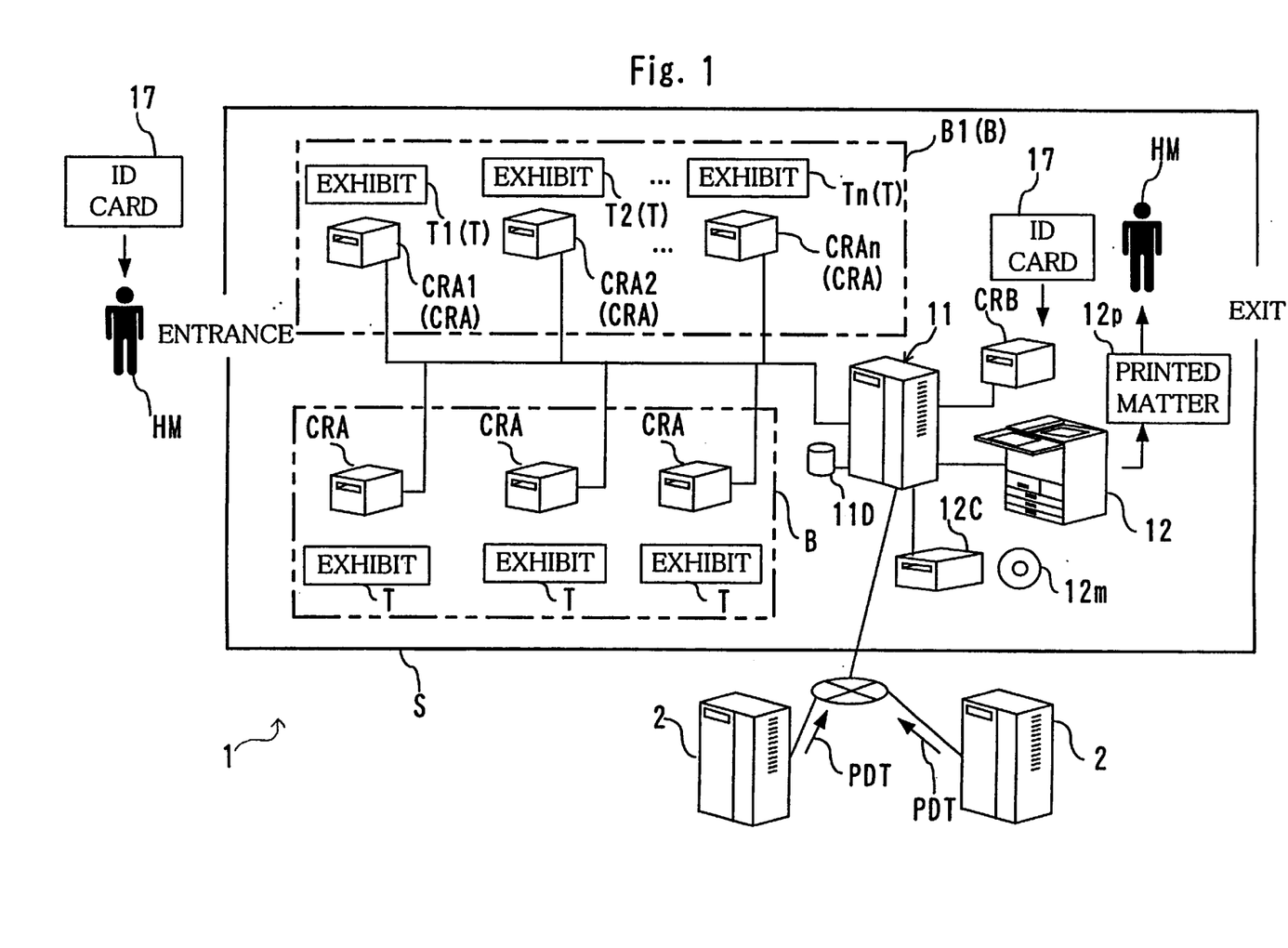
FIG. 1 is a block. diagram showing a structure of a print system according to the present invention.
Figure 2:
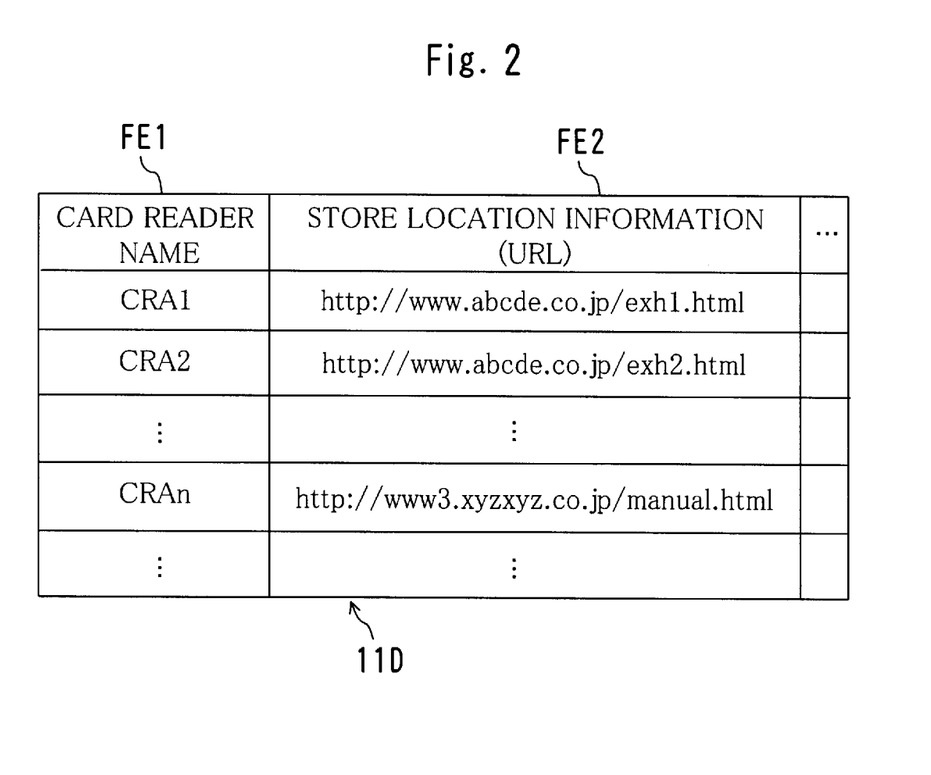
FIG. 2 is a table of an example of information including a card reader name memorized in a database.
Figure 3:
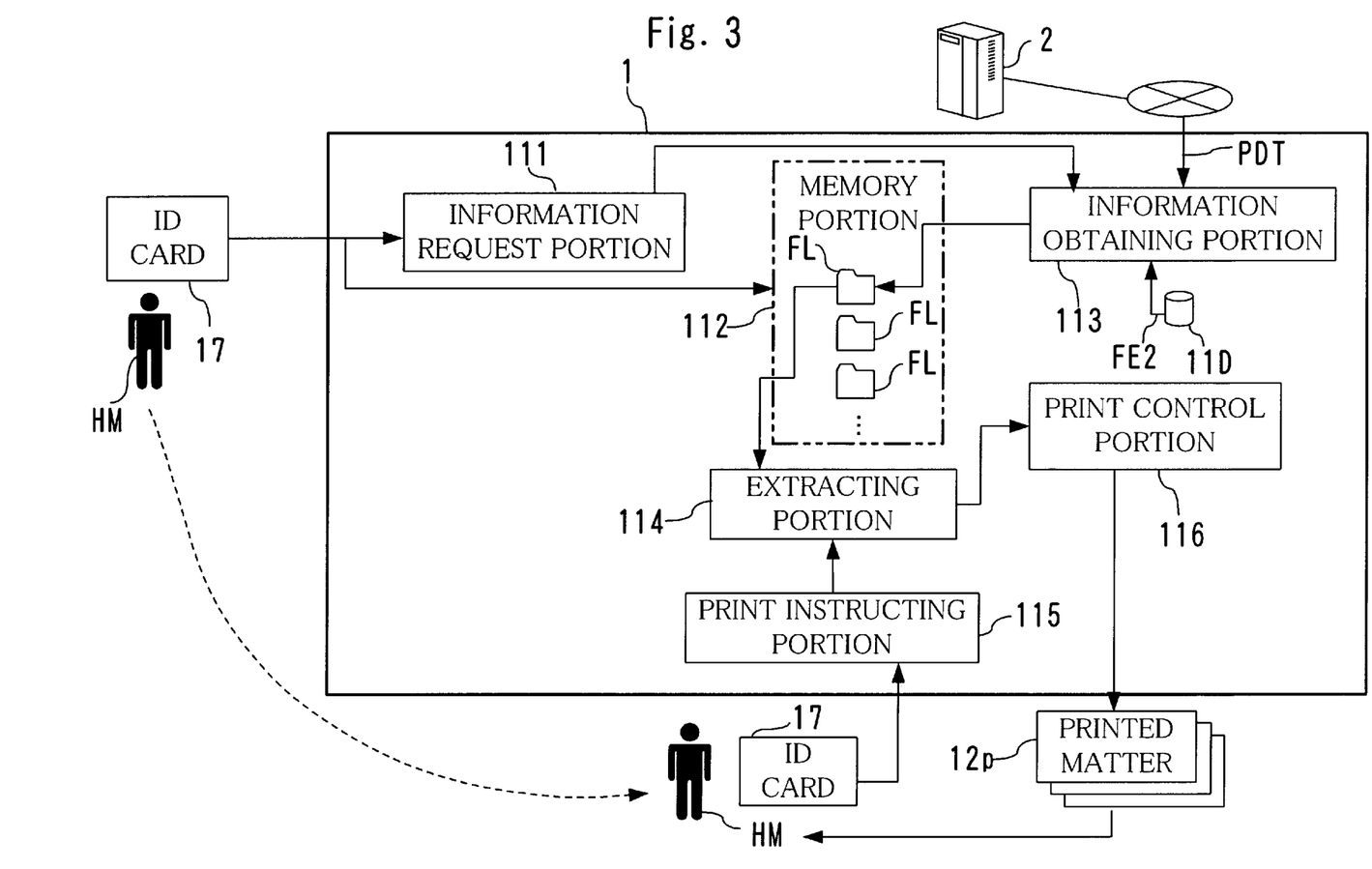
FIG. 3 is a block diagram for explaining functional structure of the print system in the first embodiment.

FIG. 1 is a block diagram showing a structure of a print system 1 according to the present invention. FIG. 2 is a table of an example of information including a card reader name FE1 memorized in a database 1iD. FIG. 3 is a block diagram for explaining functional structure of the print system 1 in the first embodiment.

As shown in FIG. 1, in a meeting place S, plural exhibition booths B are opened. The each exhibition booth B has many exhibits T, and tourers HM can tour the each exhibition booth B freely.

The meeting place S is provided with a print system 1, which includes a server 11, card readers CRA and CRB, and a printer 12.

Each exhibition booth B is provided with card readers CRA, each of which corresponds to each exhibit T. For example, the exhibition booth Bi has exhibits Ti, T2, ..., and Tn, which are associated with card readers CRA1, CRA2, ..., and CRAn, respectively.

When a tourer HM enters the meeting place S, an ID card 17 is given to the tourer HM. On the ID card 17, a unique ID is recorded.

The tourer HM can demand materials concerning an exhibit T by letting the card reader CRA corresponding to the exhibit T read his or her ID card 17. When leaving the meeting place, the tourer HM can make the card reader CRB read his or her ID card 17 for printing materials demanded at each exhibition booth by the printer 12, so as to receive the materials (printed matter 12p).

On the ID card 17, numerals having appropriate digits, characters, symbols, or dates are recorded by magnetic recording, by printing a bar code, by punching holes, or other various methods. The card readers CRA and CRB read information such as the ID of the ID card 17 by a method corresponding to the ID card 17 and transmit the read information to the server 11 online by a wired or wireless manner.

Print data PDT for printing materials concerning the exhibit T are stored in various computers to which the print system 1 can get access, including the server 11 or a WWW (World Wide Web) server 2 regardless of the inside or the outside of the print system 1.

The server 11 comprises a CPU, a RAM, a ROM, a communication control device, and a magnetic memory device so as to perform the process for controlling the printer 12 or obtaining the print data PDT. In addition, the server 11 is connected to the printer 12, a card reader CRB, and a card reader CRA corresponding to each exhibit T.

In the magnetic memory device of the server 11 is installed an operating system, a software program for a print server that controls the printer 12, and a software program for downloading data from the WWW server 2. These programs are loaded into RAM and performed by the CPU.

In addition, the magnetic memory device of the server 11 stores a database 11D. The database 11D includes, as shown in FIG. 2, a card reader name FE1 for identifying each card reader CRA, and store location information FE2 concerning a location where the print data PDT of the corresponding exhibit T are stored. For example, concerning the card reader CRA1, the card reader name FE1 is memorized as "CRA1", and the store location information FE2 is memorized by using a URL (Uniform Resource Locator) like "http://www.abcde.co.jp/exh1.html."

In this way, the print system 1 can realize functional structures as shown in FIG. 3.

As shown in FIG. 3, the print system 1 has functional portions such as an information request portion 111, a memory portion 112, an information obtaining portion 113, an extracting portion 114, a print instructing portion 115, and a print control portion 116.

The information request portion 111 distinguishes the card reader CRA that had read the ID card 17 and request the information obtaining portion 113 to obtain the print data PDT of the exhibit T corresponding to the card reader CRA.

The information obtaining portion 113 extracts the store location information FE2 of the print data PDT of the exhibit T corresponding to the card reader CRA distinguished by the information request portion 111 from the database 11D and obtains the print data PDT from the place where the store location information FE2 indicates. For example, if the card reader name FE1 of the extracted card reader CRA is "CRA2", the corresponding store location information FE2 is "http://www.abcde.co.jp/exh2.html". On this occasion, the HTTP is used as the communications protocol to obtain the file "exh2.html" as the print data PDT from the server "WWW" that belongs to the domain "abcde.co.jp".

The memory portion 112 memorizes the print data PDT obtained by the information obtaining portion 113 in connection with the ID of the ID card 17 read by the card reader CRA. As the method of memorizing in connection, the magnetic memory device of the server 11 is provided with a folder FL for each ID of the ID card 17, and the print data PDT are stored in the folder FL of the corresponding ID.

The print instructing portion 115 recognizes that the ID card 17 has been read by the card reader CRB and transmits the instruction for starting a print process to the extracting portion 114.

The extracting portion 114 searches the folder FL corresponding to the ID of the ID card 17 that was read by the card reader CRB and extracts the print data PDT that are stored in the folder FL, so as to send the print data PDT to the print control portion 116.

The print control portion 116 performs printing in accordance with the print data PDT. If the print data PDT are a hypertext, an image file such as GIF (Graphics Interchange Format) or JPEG (Joint Photographic Expect Group), or a binary file for various applications, the print data PDT are converted into data of a page description language that the printer 12 can read for printing.

Next, the process of printing in the print system 1 will be explained with reference to a flowchart.

Figure 4:
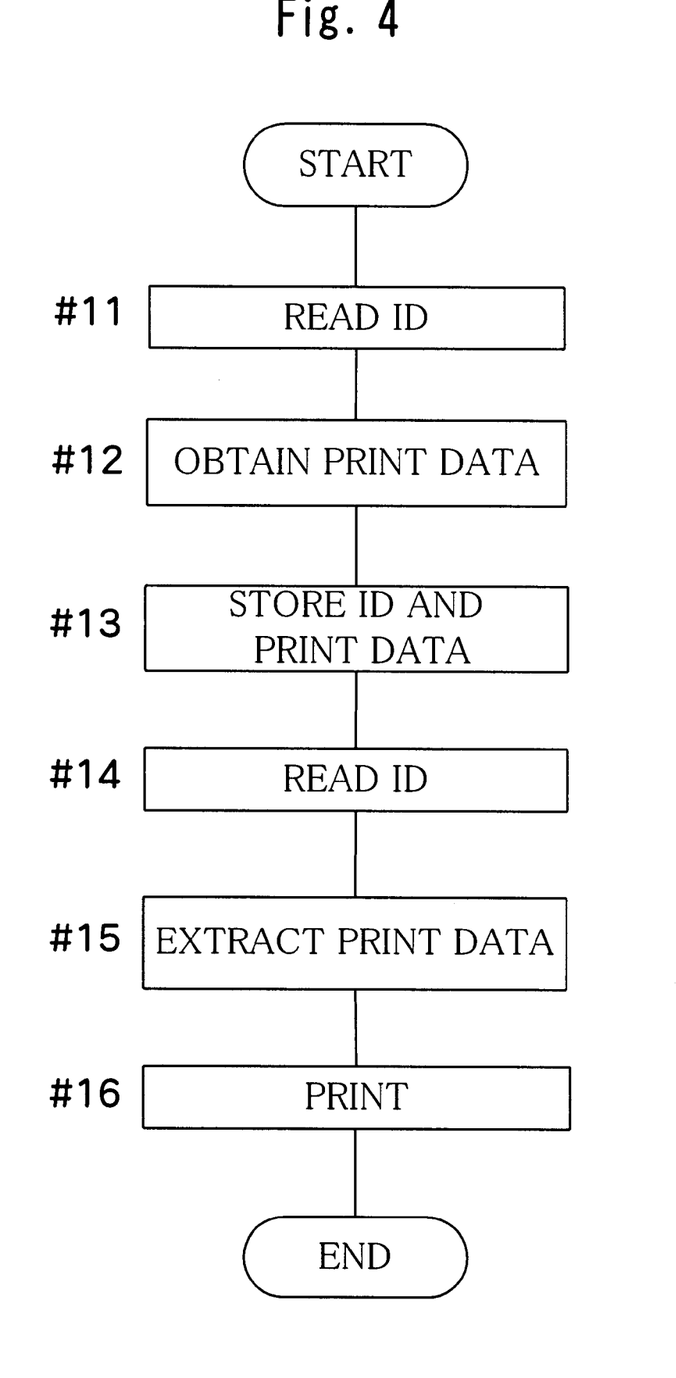
FIG. 4 is a flowchart for explaining the process of the print system.

FIG. 4 is a flowchart for explaining the process of the print system 1.

The tourer HM lets the card reader CRA read the ID card 17 for requesting materials about the exhibit T.

Then, as shown in FIG. 4, the print system 1 reads the ID of the ID card 17 (Step #11), obtains print data PDT from the place indicated by the store location information FE2 corresponding to the card reader CRA (Step #12), and stores the obtained print data PDT in the folder FL corresponding to the ID (Step #13). If there is no corresponding folder FL, a new folder FL for the ID is generated before Step #13.

The process of Steps #11–#13 is executed every time when a tourer HM lets a card reader CRA read an ID card 17.

The tourer HM, after finishing the tour of the meeting place S, lets the card reader CRB read the ID card 17 for requesting printing of materials.

Then, the print system 1 reads the ID of the ID card 17 (Step #14), extracts the print data PDT from the folder FL corresponding to the ID (Step #15), and performs printing in accordance with the print data PDT (Step #16). After that, the printed materials are handed to the tourer HM.

According to this embodiment, the print data PDT are memorized in connection with the ID of the ID card 17, and the printing is performed at one time when the tourer HM leaves the meeting place S. Therefore, the printed matter 12p is not mingled with another printed matter 12p that another tourer HM has requested. Accordingly, the tourer HM can get the materials smoothly.

Second Embodiment

Figure 5:
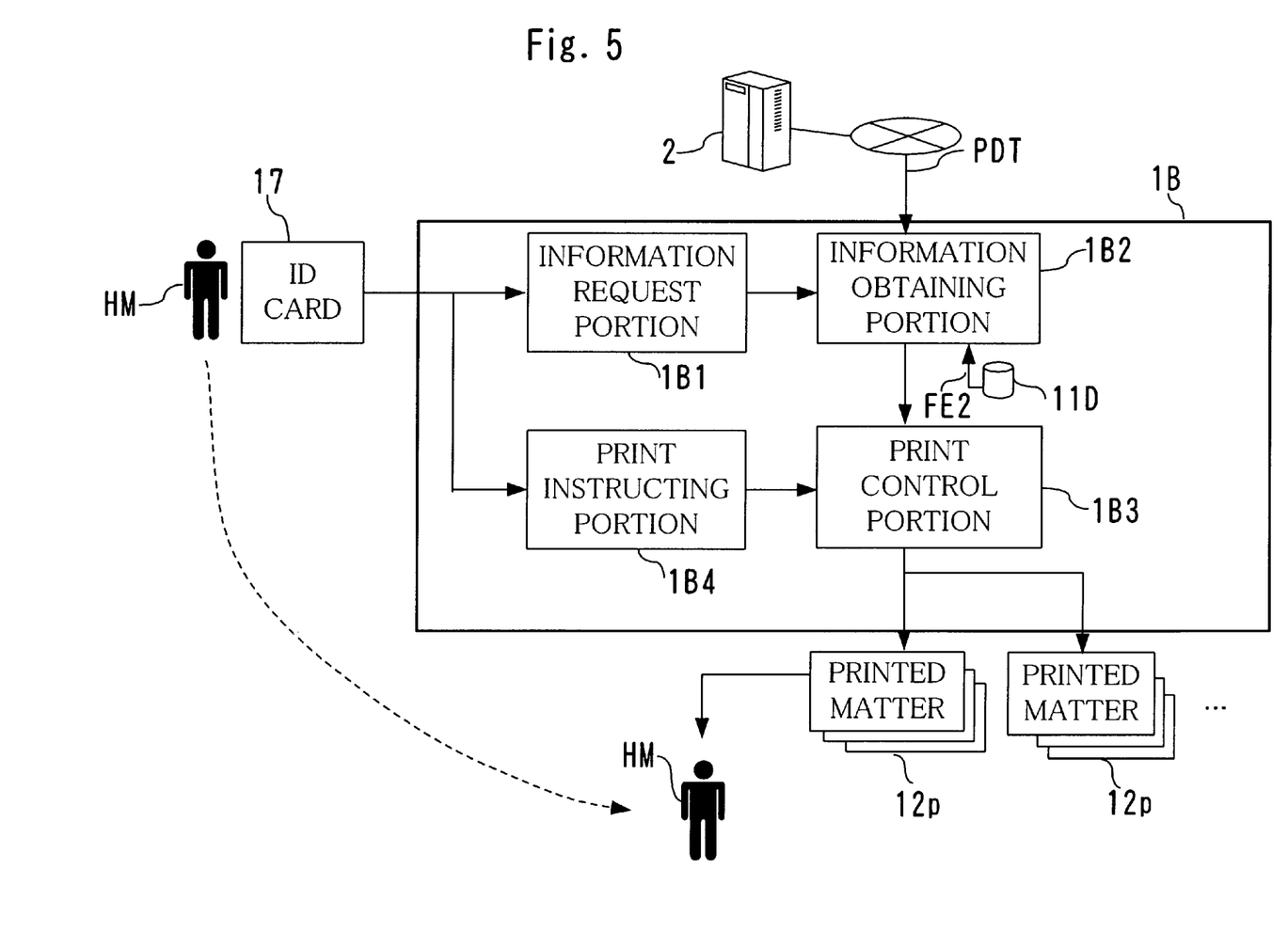
FIG. 5 is a block diagram for explaining functional structure of the print system in a second embodiment.

FIG. 5 is a block diagram for explaining functional structure of a print system 1B in a second embodiment.

In the first embodiment, the printer prints the print data PDT at one time that are stored in the folder FL corresponding to the ID of the ID card 17 when the card reader CRB reads the ID card 17, so as to hand the printed materials to the tourer HM. In the second embodiment, the printer performs printing every time when the card reader CRA reads the ID card 17, and the printed materials are sorted for each ID, so that the sorted materials are handed to the tourer HM.

The print system 1B has substantially the same structure as the print system 1 of the first embodiment shown in FIG. 1. However, the printer 12 has plural ejection trays, one of which is selected for each ID for printing. Furthermore, the card reader CRB is not necessary.

Thus, the print system 1B can realize functional structures as shown in FIG. 5.

As shown in FIG. 5, the print system 1B includes functional portions such as an information request portion 1B1, an information obtaining portion 1B2, a print control portion 1B3, and a print instructing portion 1B4.

The information request portion 1B1 and the information obtaining portion 1B2 perform similar processes to the information request portion 111 and the information obtaining portion 113, respectively.

The print instructing portion 1B4 recognizes that the card reader CRA has read the ID of the ID card 17 and sends the instruction for starting a print process to the information obtaining portion 1B2.

The print control portion 1B3 performs substantially the same process as the print control portion 116 in accordance with the print data PDT. On this occasion, the print control portion 1B3 switches the ejection tray to be used in accordance with the ID of the ID card 17. Thus, the materials can be printed with being sorted for each ID.

The tourer HM takes materials corresponding to the ID of his or her ID card 17 out of the sorted materials and leaves the meeting place S.

According to this embodiment, every time when materials of the exhibit T are requested, the print data PDT are obtained and printed, and the printed matters 12p are sorted. Therefore, the tourer HM can get the printed matter 12p at once when he or she leaves the place.

It is possible to record the information about the exhibit T on an information recording medium except paper, so that the medium is handed to the tourer. For example, as shown in FIG. 1, an external recording device 12C is provided instead of the printer 12, and the obtained print data PDT are recorded on a recording medium 12m instead of printing the printed matter 12p. As the recording medium 12m a removable disk such as a floppy disk, a CD-ROM, a CD-R, a CD-RW, a DVD-ROM, a DVD-RAM, or an magneto optical disk, an IC card, a memory stick, or a flash ROM are used. An external recording device 12C corresponding to the recording medium 12m is used. By this structure, the print control portions 1B6 and 1B3 perform the process of writing the print data PDT into the recording medium 12m. By recording on the recording medium 12m such as a CD-ROM, while the tourer tours in the exhibition booth, materials of the exhibit are prepared as an electronic file. Therefore, the tourer can get an electronic file of desired materials by visiting the exhibition booth, and exhibition booth can collect more visitors.

It is also possible to transmit the print data PDT as an electronic mail to the electronic mail address of the tourer without handing the printed matter 12p or the recording medium 12m to the tourer. For example, the electronic mail address of the tourer may be recorded on the ID card in advance, and the print data that were downloaded may be transmitted to the electronic mail address that is recorded on the ID card.

Third Embodiment

Figure 6:
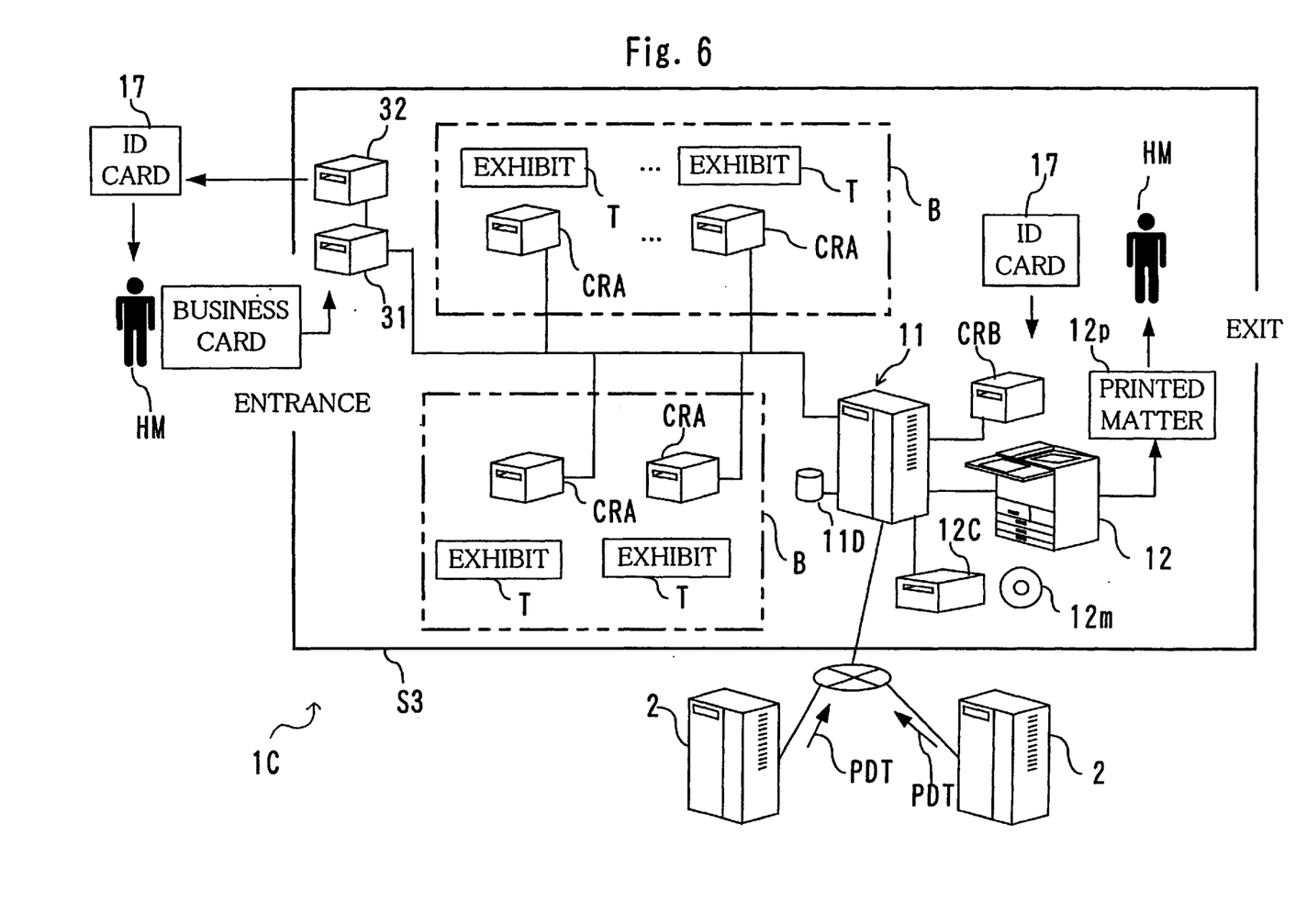
FIG. 6 is a block diagram showing a structure of an event system.

FIG. 6 is a block diagram showing a structure of an event system 1C.

In the first embodiment or the second embodiment, the ID card 17 that is distributed to the tourer HM memories numerals having appropriate digits, characters, symbols, or dates. In the third embodiment, adding to them, private information of the tourer HM is recorded on the ID card 17. Means for requesting materials of the exhibit T, means for obtaining the print data PDT, and means for providing the print data PDT to the tourer HM are the same as in the first embodiment or the second embodiment.

As shown in FIG. 6, the event system 1C is provided with an OCR device 31 and a card writer 32. Other structures are the same as the print system 1. The OCR device 31 and the card writer 32 are disposed in the vicinity of the entrance of an event meeting place S3.

The OCR device 31 scans a business card of tourers HM who enter the event meeting place S3, so as to read a name of the tourer HM, a name and an address of the company, a department, a telephone number, an electronic mail address and other private information. If the tourer HM does not have a business card, an operator may ask the tourer HM questions for inputting the name and other information by operating a personal computer. In addition, the operator may input other private information that cannot be obtained from the business card, such as an age, sex, families, a yearly income or a home address, if necessary.

The card writer 32 records the private information of the tourer HM that was read by the OCR device 31 or inputted by the operator on the ID card 17. The ID card 17 is distributed to the tourer HM. The read private information is stored in the server 11 together with the ID of the ID card 17.

Functions of the other structures are similar to the first embodiment or the second embodiment. Next, an application example of the event system 1C, e.g., in an automobile exposition, a business exposition or other exhibition will be explained.

In the event meeting place S3, there are exhibition booths B where automobile manufacturers exhibit their automobiles (exhibits T) and other plural exhibition booths B. The exhibition booth B of the automobile manufacturer is provided with plural card readers CRA for requesting materials (a leaflet, an estimate indicating a selling price and others) of each type or grade of the automobiles.

The tourer HM tours watching automobiles in the exhibition booth B and lets the card reader CRA read his or her card 17 for requesting materials of the automobile. On this occasion, in connection with the ID of the card 17, the card reader name FE1 of the card reader CRA is stored in the server 11. Thus, information about materials that the tourer HM has requested and the private information of the tourer HM are related with each other to make a database.

When finishing the tour, the tourer let the card reader CRB disposed in the vicinity of the exit read the card 17 so as to receive materials requested at each exhibition booth B. On this occasion, the tourer HM selects either the printed matter 12p that is information printed on paper sheets or a recording medium 12m such as a CD-ROM for receiving information.

The organizer of the event or the exhibition provides the database of information about materials requested by the tourer HM and the private information of the tourer HM to each company (exhibitor) who opened the exhibition booth. Thus, each exhibitor can use the database for various purposes such as research of consumer's needs. For example, a type or grade of an automobile that enjoys high popularity with each age, sex, or yearly income can be determined and the result can be used for sales promotion or development of new automobiles in the future. Further, the database can be utilized for sales promotion in the future such as transmission of direct mails (more detail information about the automobile or invitation to other events) to the tourer HM.

According to the third embodiment, since the OCR device 31 is used for scanning business cards of tourers HM, the input job of the private information of the tourers HM can be reduced compared with the conventional manual input. In addition, the organizer makes a database about information concerning materials requested by tourers HM and their private information, which can be provided to each exhibitor, so that a value of the event can be increased. The exhibitor can obtain the database at once so as to use it for sales promotion or development of new products.

According to the three embodiments explained above, the print data PDT are obtained from the place where the store location information FE2 indicates. Therefore, it is not necessary to prepare the print data PDT in each exhibition booth B. In addition, the store location information FE2 can be managed only by the database 11D of the server 11. As a result, the management of the print data PDT is easy. Furthermore, since the information is printed or recorded responding to necessity, it is unnecessary for the exhibitor to worry about excess or shortage of the materials.

The tourer HM can get the materials only by letting the card reader CRA or CRB read his or her ID card. In addition, since the tourer HM takes only necessary materials, he or she is released from a tired job of organizing the materials after coming home as a conventional manner. Especially, when a recording medium such as a CD-ROM is used, only necessary materials can be organized as an electronic database while the tourer tours. The tourer HM can manage the database by using a personal computer, so that the materials can be utilized effectively.

Though the printer and the card reader are disposed in the vicinity of the exit of the meeting place in the first embodiment or the second embodiment, they can be disposed at other places. Plural printers and plural card readers can be prepared without limiting to one set of a printer and a card reader. In accordance with the size of the meeting place or the number of tourers, the place where the printer is disposed or the number of the printers can be determined. If plural printers are arranged, the server and the printer may be connected to each other via a communication line. Alternatively, plural servers may be arranged so as to be synchronized with each other about the print data or the information such as the ID.

Though the card reader is disposed at each exhibit, one card reader can be shared among plural exhibits. Plural materials can be prepared for one exhibit. In that case, an input device is necessary for selecting any one of the plural materials. This input device is preferably a device having little buttons so that tourer can operate easily.

If many card readers are used, a computer such as a relay server is disposed at each exhibition booth, so that IDs read by the card readers within the exhibition booth are arranged together.

It is also possible to provide a proxy server for the print system and to store the downloaded print data in the proxy server temporarily. Thus, traffic of the communication can be reduced so that the whole process speed of the print system can be improved.

In the first embodiment or the second embodiment, printing of materials of exhibits is explained as an example. However, the print system according to the present invention can be used in other various forms.

For example, a card reader may be disposed in a meeting room or a hole where a lecture or a demonstration is performed, so that materials about the lecture or the demonstration can be printed.

Moreover, the structure, the process contents, the process order, the network structure or the communications protocol of the print system 1 or 1B, the server 11, or the printer 12 can be modified partly or entirely in the scope of the present invention.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A method for providing a user entering a meeting place with information, comprising:

installing a first ID reading device for reading a user ID from an ID recording medium, wherein the first ID reading device corresponds to an exhibit;

obtaining information about the exhibit when the user ID of the ID recording medium is read by the first ID reading device, the exhibit corresponding to the first ID reading device;

memorizing the obtained information in a memory in a manner to correspond to the user ID read by the first ID reading device when the information is obtained; and printing information corresponding to the user ID at one time by a printer installed in the vicinity of an exit of the meeting place when the user ID of the ID recording medium is read by a second ID reading device installed for reading the user ID from the ID recording medium in the vicinity of the exit of the meeting place, the information being part of the information memorized in the memory.

2. The method of claim 1, further comprising:

relating a URL storing the information about the exhibit corresponding to the first ID reading device to the first ID reading device; and obtaining the information via the Internet based on the URL.

3. An information providing system for providing a user entering a meeting place with information, comprising:

a first ID reading device installed for reading a user ID from an ID recording medium, wherein the first ID reading device corresponds to an exhibit;

a second ID reading device installed for reading the user ID from the ID recording medium in the vicinity of an exit of the meeting place;

obtaining means for obtaining information relating to the exhibit, which corresponds to the first ID reading device, when the user ID of the ID recording medium is read by the first ID reading device;

memory means for memorizing the information obtained by the obtaining means in a manner to correspond to the user ID read by the first ID reading device when the information is obtained; and a printer installed in the vicinity of the exit of the meeting place for printing information corresponding to the user ID at one time when the user ID of the ID recording medium is read by the second ID reading device, the information being part of the information memorized in the memory means.

4. The information providing system of claim 3, wherein a URL storing the information about the exhibit corresponding to the first ID reading device corresponds to the first ID reading device, and wherein the obtaining means obtains the information via the Internet based on the URL.

* * * * *